Figure 1:
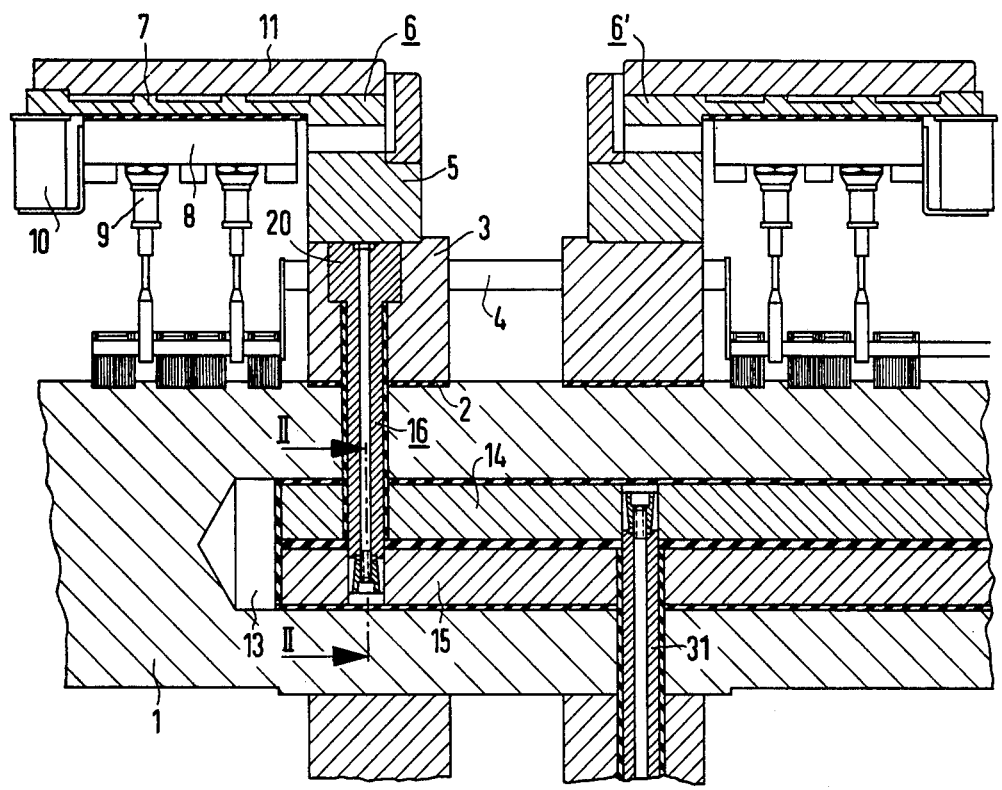

United States Patent [19]

Küter et al.

[11] 4,048,532
[45] Sept. 13, 1977

[54] ROTATING RECTIFIER ASSEMBLY

[75] Inventors: Heinrich Küter, Wattenscheid; Gerhard Krieger, Mulheim, both of Germany

[73] Assignee: Kraftwerk Union Aktiengesellschaft, Mulheim (Ruhr), Germany

[21] Appl. No.: 635,672

[22] Filed: Nov. 26, 1975

[30] Foreign Application Priority Data

Dec. 5, 1974 Germany .............................. 2457615

[51] Int. Cl.$^2$ ........................................... H02K 11/00
[52] U.S. Cl. ................................................. 310/68 D
[58] Field of Search .................. 310/68, 68 D, 72, 59, 310/61; 318/242

[56] References Cited

U.S. PATENT DOCUMENTS

| 3,283,219 | 11/1966 | Keady | 310/68 |
| 3,363,122 | 1/1968 | Hoover | 310/68 |
| 3,371,235 | 2/1968 | Hoover | 310/68 |
| 3,721,843 | 3/1973 | Spisak | 310/72 |
| 3,723,794 | 3/1973 | Spisak | 310/72 |
| 3,872,335 | 3/1975 | Petersen | 310/68 D |

FOREIGN PATENT DOCUMENTS 269,989  4/1969  Austria .............................. 310/68 D Primary Examiner—R. Skudy
Attorney, Agent, or Firm—Herbert L. Lerner

[57] ABSTRACT

An electrical machine having a rotary shaft includes a rotating rectifier assembly comprising two support wheels mounted on the shaft in insulated relationship thereto and formed with respective ring flanges, the two support wheels forming direct current poles, the shaft being formed with an axial bore, at least two direct current conductors disposed in the axial bore, and three current connecting bolts extending radially from each of the two support wheels at uniformly spaced divisions about the periphery thereof, two of the current connecting bolts extending directly to one of the direct current conductors of given polarity and the remaining one of said current connecting bolts extending insulatedly through the other of the direct current conductors having a polarity opposite to the given polarity.

3 Claims, 2 Drawing Figures

ROTATING RECTIFIER ASSEMBLY

The invention relates to a rotating rectifier assembly for electrical machines and, more particularly, to such an assembly having two support wheels insulatedly mounted on the machine shaft, the support wheels being provided with ring flanges for receiving the active components of the rectifier assembly, the support wheels forming both direct current poles, direct current being conducted through radial current connecting bolts to two direct current conductors disposed in an axial bore formed in the shaft.

Such a device has become known heretofore from U.S. Pat. No. 3,721,843 wherein, a single bolt is inserted radially from the outside into the hub ring of each support wheel and extends to the respective direct current conductor in the axial shaft bore. In addition, a separate connecting strap is provided from the support wheel to this bolt. Because of the high currents to be transferred or transmitted, these bolts must be constructed with a relatively large diameter so that, thereby, the shaft is considerably weakened by the size of the bores formed therein into which the bolts extend. Furthermore, asymmetries with respect to the bending resistance of the shaft are produced. In order to balance nonuniform current distribution, moreover, additional current distribution rings are required for the most part.

It is accordingly an object of the invention to provide a rotating rectifier assembly having current connecting bolts of such disposition and construction that will require only minimal weakening of the shaft and will not result in the occurrence of any asymmetries with respect to the bending resistance of the shaft.

With the foregoing and other objects in view, there is provided, in accordance with the invention, in an electrical machine having a rotary shaft, a rotating rectifier assembly comprising two support wheels mounted on the shaft in insulated relationship thereto and formed with respective ring flanges, the two support wheels forming direct current poles, the shaft being formed with an axial bore, at least two direct current conductors disposed in the axial bore, and three current connecting bolts extending radially from each of the two support wheels at uniformly spaced divisions about the periphery thereof, two of the current connecting bolts extending directly to one of the direct current conductors of given polarity and the remaining one of the current connecting bolts extending insulatedly through the other of the direct current conductors having a polarity opposite to the given polarity.

Through this disposition of three bolts in uniformly spaced peripheral divisions, optimal symmetry is attained. The diameter of the radial bolt bores is considerably smaller than for the heretofore known devices of this general type so that the shaft is only negligibly weakened. Furthermore, uniform current distribution is produced so that additional current distribution rings are not required.

In accordance with another feature of the invention, the current connecting bolts are formed at the radially inner ends thereof with a spread contact, a spread cone is received in the spread contact, and clamping bolt means extend axially through the current connecting bolts, the clamping bolt means clamping the spread cone to the respective direct current conductor.

In accordance with a further feature of the invention, the two support wheels respectively comprise an intermediate ring formed of nonmagnetic material insulatedly mounted on the shaft and a support wheel hub shrink-fitted on the intermediate ring, each of the current connecting bolts having a widened head at the radially outer end thereof, the bolt head being held in the intermediate ring, the bolt head being in electrical contact with the intermediate ring as well as, through an end surface thereof, with the support wheel hub shrink fitted on the intermediate ring.

Other features which are considered as characteristic for the invention are set forth in the appended claims.

Although the invention is illustrated and described herein as embodied in a rotating rectifier assembly, it is nevertheless not intended to be limited to the details shown, since various modifications and structural changes may be made therein without departing from the spirit of the invention and within the scope and range of equivalents of the claims.

Figure 2:
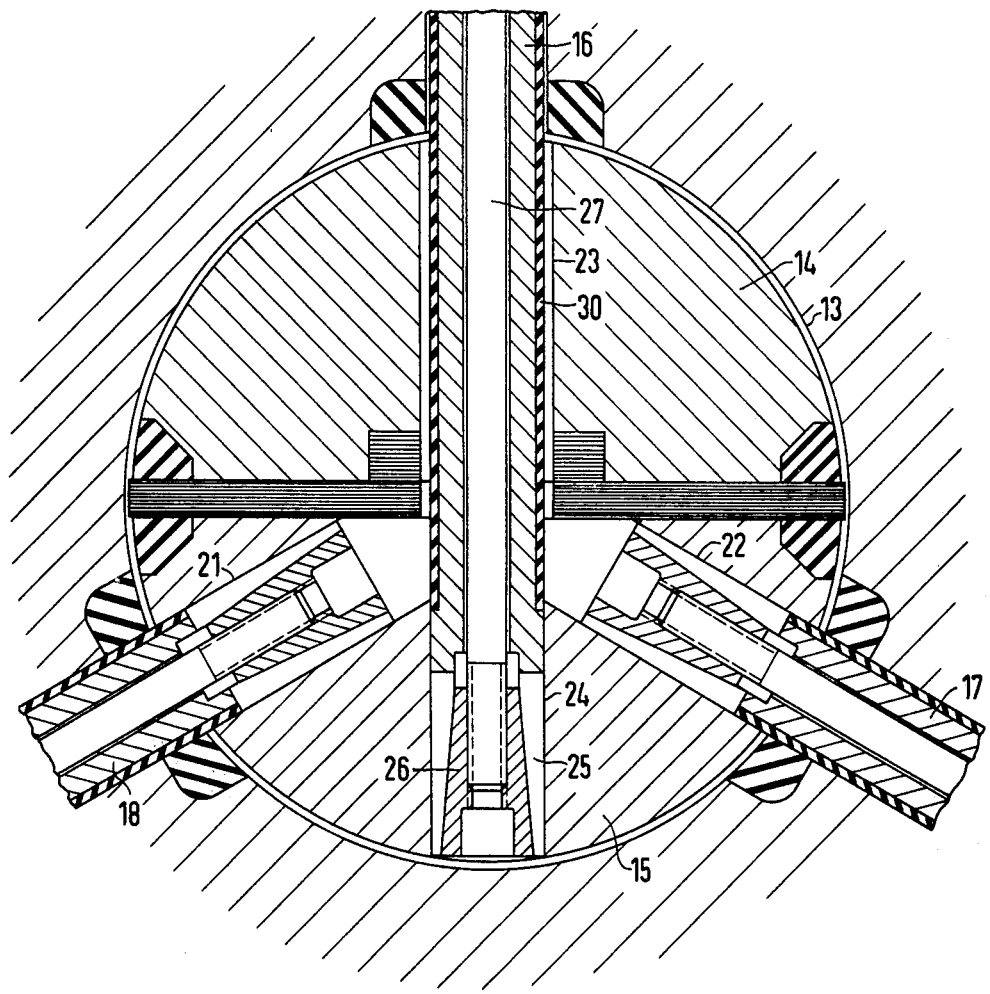

The construction and method of operation of the invention, however, together with additional objects and advantages thereof will be best understood from the following description of specific embodiments when read in connection with the accompanying drawings, in which:

FIG. 1 is a partial longitudinal sectional view of a shaft of an electrical machine carrying a rectifier assembly constructed in accordance with the invention; and FIG. 2 is an fragmentary enlarged cross-sectional view of FIG. 1 taken along the line II-II in direction of the arrows and showing the direct-current conductors disposed in the shaft bore in vicinity of the junction therewith of radial current-connecting bolts of a support wheel.

Referring now to the drawing and first, particularly, to FIG. 1 thereof, there is shown a rotatable rectifier assembly constructed in accordance with the invention, which includes a support wheel 6 mounted with an interposed intermediate insulating layer 2 on a shaft 1 of an electrical machine. The support wheel 6 is made up of an intermediate ring 3 formed of nonmagnetic material and a hub 5 shrink-fitted without insulation therebetween on the intermediate ring 3. The support wheel 6 further includes at the outer periphery thereof a flange ring 7 integral with the hub 5 and carrying all of the active components of the rectifier assembly such as heat sinks or cooling elements 8, rectifier cells or diodes 9 and fuses 10. A cap ring 11 of high-strength material is shrink-fitted on the flange ring 7. The support wheel 6 simultaneously forms one of the direct-current poles of the rectifier assembly, while the other of the poles is formed by another support wheel 6' which is constructed in a manner similar to, although a mirror image of, the support wheel 6 and is assembled back-to-back with the latter. Respective three-phase current conductors 4 extend from an otherwise nonillustrated three-phase current exciter and through the intermediate ring 3 and connected to the corresponding rectifier cells 9.

Two direct-current conductors 14 and 15 are laid in an axially extending bore 13 formed in the shaft 1 and conduct exciter current to the exciter winding of a generator rotor, both of which are not illustrated because they do not per se form any part of the invention of the instant application. According to the embodiment shown in FIG. 1, direct current with the polarity of the support wheel 6 is supposed to be conducted by the conductor 15 to the nonillustrated generator, and direct current with the polarity of the support wheel 6' by the direct-current conductor 14. As is apparent from the cross-sectional view of the axial shaft bore 13 in FIG. 2, three current-connecting bolts 16, 17 and 18 are provided for the current connection of the support wheel 6 to the respective direct-current conductor 15, and are distributed in uniform divisions or graduations about the periphery of the shaft 1. As is readily apparent from the view of the embodiment in FIG. 1, the current-connecting bolts 16, 17 and 18 are inserted radially from the outside into corresponding bores formed in the intermediate ring 3, the bolts 16, 17 and 18 having widened heads 20, respectively, that are in electrical contact both with the intermediate ring 3 as well as, through the end surface of the latter, with the support wheel hub 5.

According to FIG. 2, both current-connecting bolts 17 and 18 extend directly into the respective direct-current conductor 15 and terminate in corresponding radial bores 21 and 22 formed in the conductor 15. The third current-connecting bolt 16, in contrast thereto, extends, however, initially through a bore 23 of the direct-current conductor 14 of the other polarity, separated by an insulating layer 30 from the surface of the direct-current conductor 14, which defines the bore 23, and ends in a bore 24 formed in the direct-current conductor 15. To effect a firm contact of the bolts 16, 17 and 18 with the respective direct-current conductor 15, the introduced or lower ends of the respective bolts 16, 17 and 18 are provided with a split or spread contact 25 into which a split or spread cone 26 is inserted which is drawn axially into the split contact 25 through a clamping bolt 27 extending axially through the respective current-connecting bolts 16, 17 and 18. Consequently, firm contact with the respective direct-current conductor 15 is assured, on the one hand, while sliding in radial direction at varying thermal expansions is afforded, however, on the other hand.

The current-connecting bolts 16, 17 and 18 of the other support wheel 6' are disposed therein in the same manner as the bolts 16, 17 and 18 are disposed in the support wheel 6; in that regard, it is apparent from FIG. 1 that the one bolt 31 initially extends through the direct-current conductor 15 having polarity other than that of the direct-current conductor 14, is insulated from the surface of the direct-current conductor 15 and, in a manner corresponding to that of the bolt 16, terminates in the direct-current conductor 14, located at the support wheel 6'.

The embodiment illustrated in the drawing includes a rectifier assembly with support wheels 6, 6' having respective separated intermediate rings 3 into which the respective current-connecting bolts 16, 31 extend. The rectifier assembly according to the invention is not limited to the support wheel construction of the illustrated embodiment but rather can find use with all rotating rectifier assemblies wherein the aforedescribed difficulties or disadvantages exist.

There is claimed:

1. In an electrical machine having a rotary shaft, a rotating rectifier assembly comprising two support wheels mounted on the shaft in insulated relationship thereto and formed with respective ring flanges, said two support wheels forming direct current poles, the shaft being formed with an axial bore, at least two direct current conductors disposed in said axial bore, and three current connecting bolts extending radially from each of said two support wheels at uniformly spaced divisions about the periphery thereof, two of said current connecting bolts extending directly to one of said direct current conductors of given polarity and the remaining one of said current connecting bolts extending insulatedly through the other of said direct current conductors having a polarity opposite to said given polarity, said three current connecting bolts all terminating in the respective direct current conductor in a common plane transverse to the respective direct current conductor.

2. Rotating rectifier assembly according to claim 1 wherein said current connecting bolts are formed at the radially inner ends thereof with a spread contact, a spread cone received in said spread contact, clamping bolt means extending axially through said current connecting bolts, said clamping bolt means clamping said spread cone to the respective direct current conductor.

3. Rotating rectifier assembly according to claim 1 wherein said two support wheels respectively comprise an intermediate ring formed of nonmagnetic material insulatedly mounted on the shaft and a support wheel hub shrink-fitted on said intermediate ring, each of said current connecting bolts having a widened head at the radially outer end thereof, said bolt head being held in said intermediate ring, said bolt head being in electrical contact with said intermediate ring as well as, through an end surface thereof, with said support wheel hub shrink fitted on said intermediate ring.

* * * * *